United States Patent
Hwang et al.

(10) Patent No.: US 10,555,314 B2
(45) Date of Patent: Feb. 4, 2020

(54) SIGNALING OF NETWORK-ASSISTED INTRA-CELL INTERFERENCE CANCELLATION AND SUPPRESSION

(71) Applicant: HFI INNOVATION INC., Zhubei, Hsinchu County (TW)

(72) Inventors: Chien-Hwa Hwang, Hsinchu County (TW); Pei-Kai Liao, Nantou County (TW); Lung-Sheng Tsai, Tainan (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 12 days.

(21) Appl. No.: 14/868,738

(22) Filed: Sep. 29, 2015

(65) Prior Publication Data

US 2016/0100413 A1 Apr. 7, 2016

Related U.S. Application Data

(60) Provisional application No. 62/060,802, filed on Oct. 7, 2014.

(51) Int. Cl.
*H04W 72/08* (2009.01)
*H04B 7/0452* (2017.01)

(52) U.S. Cl.
CPC ........ *H04W 72/082* (2013.01); *H04B 7/0452* (2013.01)

(58) Field of Classification Search
None
See application file for complete search history.

(56) References Cited

U.S. PATENT DOCUMENTS

| 9,019,924 B2 | 4/2015 | Ng et al. ............... 370/329 |
| 2010/0290548 A1* | 11/2010 | Hoshino .......... H04B 7/0426 375/260 |
| 2013/0021991 A1* | 1/2013 | Ko .................. H04B 7/0413 370/329 |
| 2014/0029562 A1 | 1/2014 | Kishiyama |

(Continued)

FOREIGN PATENT DOCUMENTS

| CN | 103427873 A | 5/2012 |
| CN | 103281788 A | 9/2013 |

(Continued)

OTHER PUBLICATIONS

3GPP TR 36.86, "Study on Network Assisted Interference Cancellation and Suppression for LTE" (64 pages).

(Continued)

*Primary Examiner* — Thinh D Tran
(74) *Attorney, Agent, or Firm* — Oblon, McClelland, Maier & Neustadt, L.L.P.

(57) ABSTRACT

Signaling methods to support robust interference cancellation by obtaining information associated with interfering signals from the network side are provided. The target interference for cancellation is intra-cell interference from MU-MIMO or NOMA operation. A victim receiver receives both desired signal and intra-cell interfering signal. The network may assist the victim receiver by providing information related to the interfering signal. The computational complexity of the victim receiver in blindly detecting the interference signal characteristics is reduced, and the reliability of the signal detection is improved.

22 Claims, 5 Drawing Sheets

(56) References Cited

U.S. PATENT DOCUMENTS

| | | | |
|---|---|---|---|
| 2014/0086372 A1* | 3/2014 | Kishiyama | H04J 11/0036 375/346 |
| 2014/0133384 A1 | 5/2014 | Moulsley et al. | |
| 2014/0233407 A1* | 8/2014 | Pourahmadi | H04L 5/0007 370/252 |
| 2014/0307703 A1* | 10/2014 | Gaal | H04L 5/0073 370/330 |
| 2014/0362769 A1* | 12/2014 | Chen | H04J 11/0036 370/328 |
| 2015/0009948 A1* | 1/2015 | Raaf | H04W 48/16 370/330 |
| 2016/0014785 A1* | 1/2016 | Benjebbour | H04W 52/241 370/329 |
| 2016/0100411 A1* | 4/2016 | Kuchi | H04B 7/024 370/329 |
| 2016/0157243 A1* | 6/2016 | Janis | H04J 11/0056 370/329 |
| 2019/0268792 A1* | 8/2019 | Marinier | H04W 24/10 |

FOREIGN PATENT DOCUMENTS

| | | | |
|---|---|---|---|
| CN | 103686793 A | 3/2014 | |
| CN | 103843432 A | 6/2014 | |
| EP | 2648448 A1 | 4/2012 | |
| EP | 2 858 281 A1 | 4/2015 | |
| WO | WO 2013/176042 A1 | 11/2013 | |
| WO | WO 2014/125892 A1 | 8/2014 | |

OTHER PUBLICATIONS

TSG-RAN Meeting #60 RP-130594, Status Report for "Study on Network Assisted Interference Cancellation and /suppression for LTE", Oranjestad, Aruba dated Jun. 11-14, 2013 (8 pages).

TSG-RAN Meeting #61 RP-131241, Status Report for "Study on Network Assisted Interference cancellation and Suppression for LTE", Porto, Portugal dated Sep. 3-6, 2013 (4 pages).

International Search Report and Written Opinion of International Search Authority for PCT/CN2015/091299 dated Jan. 7, 2016 (12 pages).

Extended European Search Report dated Feb. 26, 2018 in European Patent Application No. 15849289.2, 7 pages.

Office Action dated Mar. 25, 2019 in corresponding European Patent Application No. 15 849 289.2, 5 pages.

Combined Chinese Office Action and Search Report dated Mar. 21, 2019 in corresponding Chinese Patent Application No. 201580028193.4 (with English Translation of Category of Cited Documents), 9 pages.

European Office Action dated Aug. 8, 2019 in European Patent Application No. 15 849 289.2—1220.

* cited by examiner

SIGNALING OF NETWORK-ASSISTED INTRA-CELL INTERFERENCE CANCELLATION AND SUPPRESSION

CROSS REFERENCE TO RELATED APPLICATIONS

This application claims priority under 35 U.S.C. § 119 from U.S. Provisional Application No. 62/060,802, entitled "Signaling of Network-Assisted Intra-Cell Interference Cancellation and Suppression," filed on Oct. 7, 2014, the subject matter of which is incorporated herein by reference.

TECHNICAL FIELD

The disclosed embodiments relate generally to mobile communication networks, and, more particularly, to methods for intra-cell interference cancellation/suppression with network assistance.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

3GPP started a new study item, "Network Assisted Interference Cancellation and Suppression" (NAICS), to investigate the benefit on system throughput by leveraging receiver's capability of interference cancelation. Various types of interference cancellation (IC) receivers are shown to provide significant gain if some characteristics of interference are available at victim nodes. Commonly investigated IC techniques in literature may include symbol-level based IC (SL-IC) and codeword-level IC (CW-IC). SL-IC is an IC technique that detects interfering signal, which is supposed to be finite-constellation modulated, in a per-symbol basis. CW-IC is referred to that a receiver decodes and re-encodes interference codeword to reconstruct the contribution of the interference signal on its received signal. Comparing to SL-IC, a receiver needs more information on interference to access CW-IC, such as modulation and coding scheme (MCS) index and the rule scrambling the bit stream of interference.

Obtaining the interference characteristics, such as the modulation order or encoding rules of the interfering signal, is important for interference cancellation techniques. The characteristics could be either blindly detected by victim receiver or informed from network side. A number of 3GPP contributions under the study items of NAICS (e.g., 3GPP TR 36.866, 3GPP RP-130594, 3GPP RP-131241) showed the performance results of the advance receivers, including SL-IC, reduced-maximum likelihood (R-ML), and CW-IC receivers, with the assistance of network signaling.

The NAICS study item includes the following two main scenarios: 1) Intra-cell interference resulted from current single user (SU)-/multiuser (MU)-multiple input multiple output (MIMO) operation, and 2) Inter-cell interference based on deployment scenarios prioritized in LTE Rel-11, taking into account scenarios under Rel-12 work items/study items such as small cells. The study item has mostly focused on the inter-cell (or inter-point) case. It was concluded that SL-IC/R-ML receivers, with the network assistance of higher layer signaling of interference parameters (including any subset restriction) related to interference cells' common reference signal (CRS)/physical downlink control channel (PDCCH) transmission, could achieve noticeable gain over Rel-11 linear minimum mean square error (LMMSE)-interference rejection combining (IRC) receivers. The so-called NAICS receivers are also required to blind detect many parameters, including all the dynamic parameters to avoid any scheduling constraints that semi-static signaling may incur.

MU-MIMO has been defined in LTE since Rel-8 and Rel-9/10, but still no massive deployment yet. With the MU design in the current LTE, it is completely the BS's responsibility to minimize any MU interference after precoding which could be still based on limited UE codebook based feedback in frequency division duplexing (FDD). The residual MU interference is one of the reasons for limited system throughput gain for MU-MIMO over SU-MIMO where inter-layer interference can be more effectively cancelled with the complete knowledge for both layers. It is expected that the Rel-12 NAICS receivers can at least improve the MU performance if MU interference information can be provided or accurately detected. MU operation is expected to become more suitable with the increasing interest in the deployment of 4-TX and 8-TX BSs. MU-MIMO has also received a lot of interest in IEEE 802.11 to better serve multiple UEs in a conference room scenario with good fairness.

The concept of a joint optimization of MU operation from both transmitter and receiver's perspective has the potential to further improve MU system capacity even if the transmission/precoding is non-orthogonal. For example, the simultaneous transmission of a large number of non-orthogonal beams/layers with the possibility of more than one layer of data transmission in a beam. Such joint TX/RX optimization associated with adaptive TX power allocation and CW-IC receiver is referred to as non-orthogonal multiple access (NOMA). Joint TX/RX optimization might require standardization effort on the signaling and feedback aspects. Hence, it is important to study the tradeoff in terms of system performance, complexity, and singling overhead.

In a radio communication system, a receiver of a UE can be very complex and unreliable if it must detect or estimate all the characteristics of an interfering signal, especially when the parameters related to the interfering signal can be very dynamic. A signaling method is sought for the network to assist the victim receiver by providing information related to the interfering signal. By doing so, the computation complexity of the victim receiver in blindly detecting the interfering signal characteristics can be reduced, and the reliability of the signal detection can be improved.

SUMMARY

Signaling methods to support robust interference cancellation by obtaining information associated with interfering signals from the network side are provided. The target interference for cancellation is intra-cell interference from MU-MIMO or NOMA operation. A victim receiver receives both desired signal and intra-cell interfering signal. The network may assist the victim receiver by providing information related to the interfering signal. The computational complexity of the victim receiver in blindly detecting the interference signal characteristics is reduced, and the reliability of the signal detection is improved.

In a first embodiment, a base station allocates a time-frequency resource to a first UE and a second UE in a serving cell of a mobile communication network. The base station determines a set of parameters related to signals present in the allocated time-frequency resource. The set of parameters comprises parameters related to a first signal and a second signal dedicated to the first UE and the second UE respectively. The base station transmits the set of parameters to the second UE for the second UE to cancel or suppress a contribution of the first signal as an intra-cell interfering signal.

In a second embodiment, a user equipment receives a desired signal and an interfering signal in a serving cell of a mobile communication network. The desired signal and the interfering signal are present in the same time-frequency resource. The UE derives a first set of parameters related to the interfering signal. The UE also obtains a second set of parameters related to the interfering signal with network assistance. The UE cancels or suppresses a contribution of the interfering signal from the desired signal based on the combination of the first and the second set of parameters.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
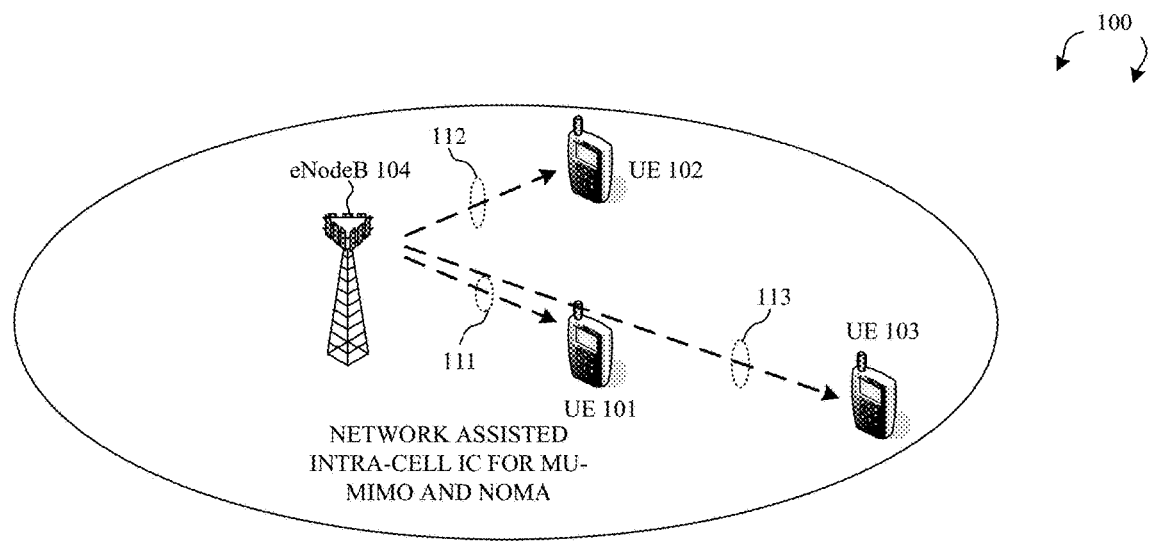
FIG. 1 illustrates a mobile communication network with interference cancellation for intra-cell interference in accordance with one novel aspect.

FIG. 1 illustrates a mobile communication network 100 with interference cancellation for intra-cell interference in accordance with one novel aspect. Mobile communication network 100 is an OFDM network comprising a plurality of user equipments UE 101, UE 102, and UE 103, and a serving base station eNB 104. In 3GPP LTE system based on OFDMA downlink, the radio resource is partitioned into subframes in time domain, each subframe is comprised of two slots and each slot has seven OFDMA symbols in the case of normal Cyclic Prefix (CP), or six OFDMA symbols in the case of extended CP. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. Resource elements are grouped into resource blocks, where each resource block (RB) consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

In the example of FIG. 1, UE 101 is served by its serving base station eNB 104. UE 101 receives desired radio signal 111 transmitted from eNB 104. However, UE 101 also receives interfering radio signals. In one example, UE 101 receives intra-cell interfering radio signal 112 transmitted from the same serving eNB 104 due to multiuser multiple input multiple output (MU-MIMO) operation intended for multiple UEs (e.g., UE 102) in the same serving cell. In another example, UE 101 receives intra-cell interfering radio signal 113 transmitted from the same serving eNB 104 due to non-orthogonal multiple access (NOMA) operation intended for multiple UEs (e.g., UE 103) in the same serving cell. UE 101 may be equipped with an interference cancellation (IC) receiver that is capable of cancelling the contribution of the interfering signals from the desired signals.

In the "Network Assisted Interference Cancellation and Suppression" (NAICS) study item, various parameter candidates helpful for interference cancellation were identified. For example, parameters that are higher-layer configured per the current specifications (e.g., transmission mode, cell ID, MBSFN subframes, CRS antenna ports, $P_A$, $P_B$); parameters that are dynamically signaled per the current specifications (e.g., CFI, PMI, RI, MCS, resource allocation, DMRS ports, $n_{ID}^{DMRS}$ used in TM10); and other deployment related parameters (e.g., synchronization, CP, subframe/slot alignment). Although it is possible to let receiver detect or estimate these parameters associated with the interfering signal without any aid of signaling, the complexity cost could be very huge to estimate them. Furthermore, since interference characteristic may change for every PRB/subframe, dynamic signaling all the parameters is not feasible.

In accordance with one novel aspect, signaling methods to support robust interference cancellation by obtaining information associated with interfering signals from the network side are provided. The target interference for cancellation is intra-cell interference from MU-MIMO or NOMA operation. The target receiver types include both symbol-level IC (SL-IC) and codeword-level IC (CW-IC) receivers. The signaling methods mainly comprise 1) what parameters to be signaled and 2) how to signal a parameter (format of signaling).

Figure 2:
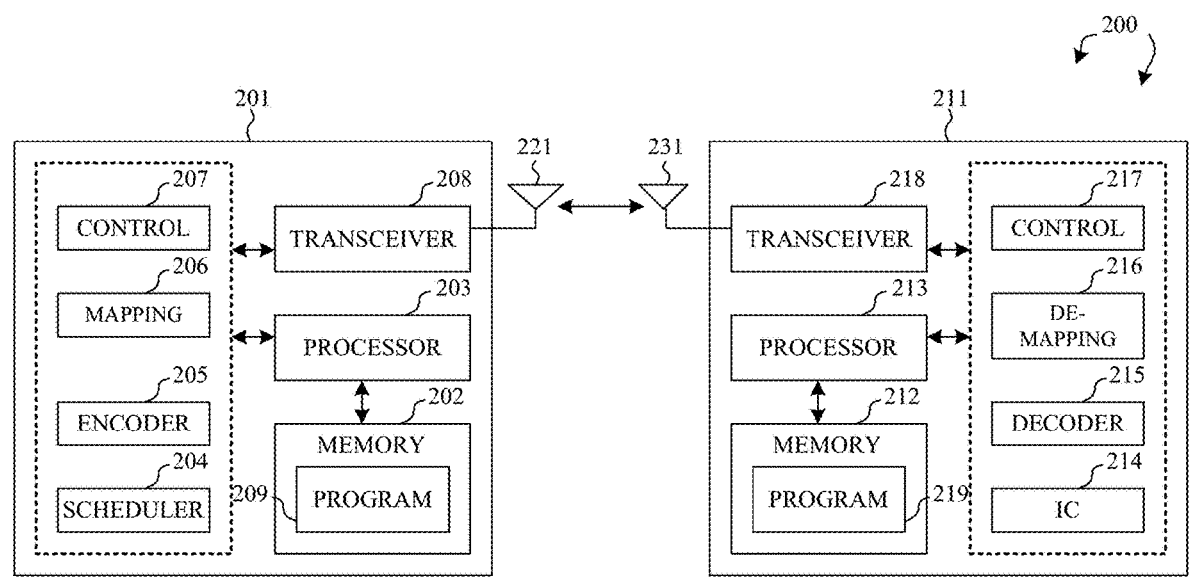
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via encoder 205), mapping (via mapping circuit 206), and transmit control information and data (via control circuit 207) to UE 211, and allow UE 211 to receive, de-mapping (via de-mapper 216), and decode (via decoder 215) the control information and data (via control circuit 217) accordingly with interference cancellation capability. In one example, base station 201 provides assistant information that include parameters related to interfering signals to UE 211. Upon receiving the related parameters, UE 211 is then able to perform interference cancellation via IC module 214 to cancel the contribution of the interfering signals accordingly.

Figure 3:
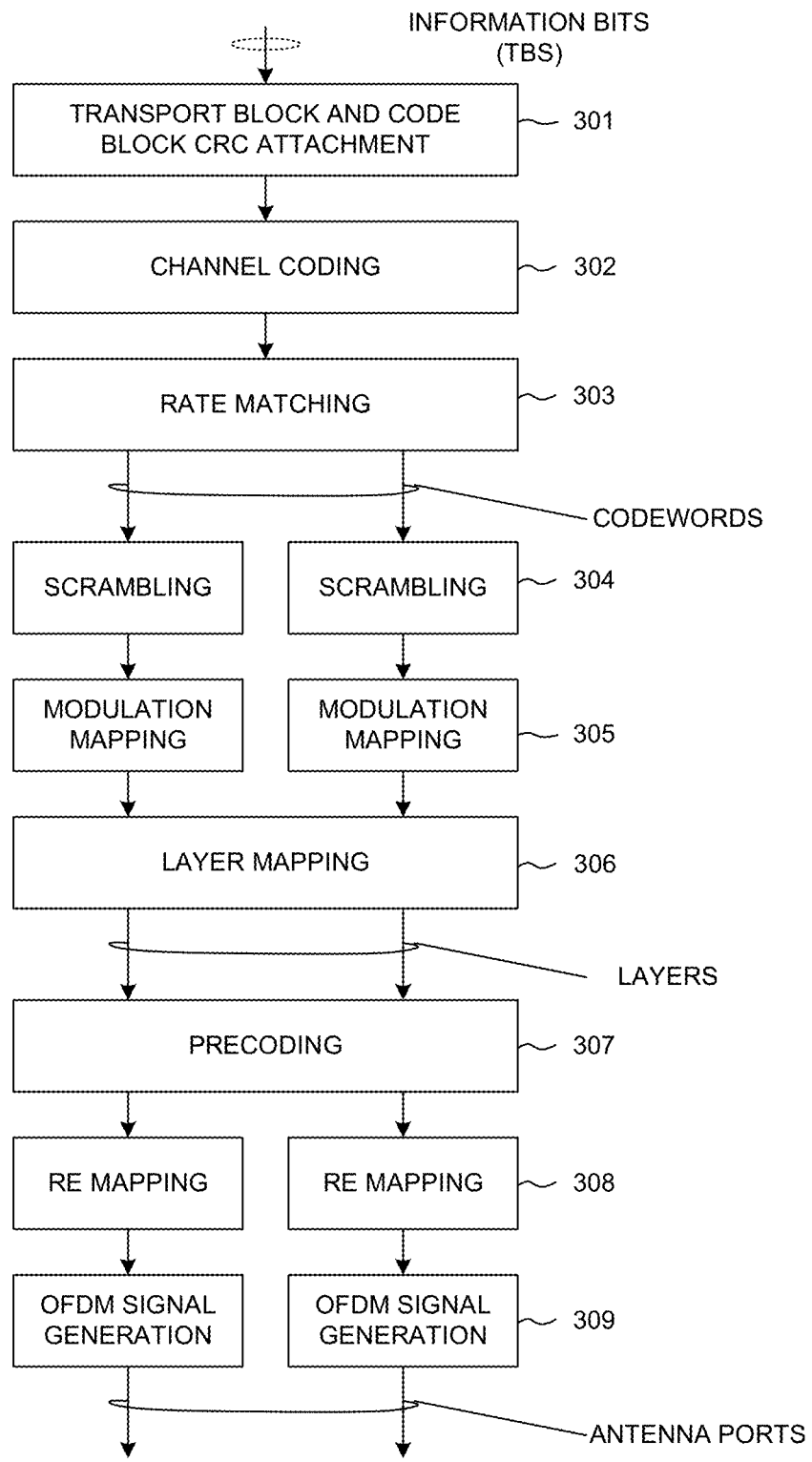
FIG. 3 illustrates functional blocks in a communication system that maps information bits of a transport block to codewords and then maps to baseband signals for transmission.

FIG. 3 illustrates functional blocks of a transmitting device in a communication system that map information bits of a transport block (TB) to codewords and then map to baseband signals for transmission. In step 301, the information bits are arranged into transport blocks (TBs) and attached with CRC. In addition, the TBs are segmented into code blocks and attached with CRC. In step 302, channel coding (forward error correction such as Turbo coding) is performed with certain code rate. In step 303, rate matching is performed, which creates an output with a desired code rate, and where the TBs are mapped into codewords. In step 304, the codewords are scrambled based on predefined scrambling rule (e.g., scramble with a corresponding Radio Network Temporary Identifier (RNTI) of the UE). In step 305, modulation mapping is performed, where the codewords are modulated based on various modulation orders (e.g., PSK, QAM) to create complex-valued modulation symbols. In step 306, layer mapping is performed, where the complex-valued symbols are mapped onto different MIMO layers depending on the number of transmit antenna used. In step 307, precoding is performed with certain precoding matrix index (PMI) for each antenna port. In step 308, the complex-valued symbols for each antenna are mapped onto corresponding resource elements (REs) of physical resource blocks (PRBs). Finally, in step 309, OFDM signals are generated for baseband signal transmission via antenna ports.

The mapping rules in these functional blocks should be known for a receiving device to receive the transport blocks. A UE receives information-bearing signal propagating though wire channel or wireless channel and processes it to recover the transport block. For the UE to receive TBs carried by PDSCH, it first needs to know the DCI carried by PDCCH associated with these transport blocks. The DCI indicates the rules that map the information bits of each TB to the modulated symbols carried on PDSCH, the RB-allocation for the encoded and modulated symbols of the transport blocks, information related to the reference signals used for channel estimation, and power control commands. UE decodes the TBs based on received control information and the configured parameters provided by network.

While the UE receives and decodes the information bits from the desired radio signals, the UE also receives undesired interfering radio signals. The UE thus needs to cancel the contribution of the interfering signals from the desired signals. An efficient way to signal information about the interfering signals would reduce the receiver's complexity to estimate/detect interference information and help the receiver to provide better performance resulting from IC gain.

Figure 4:
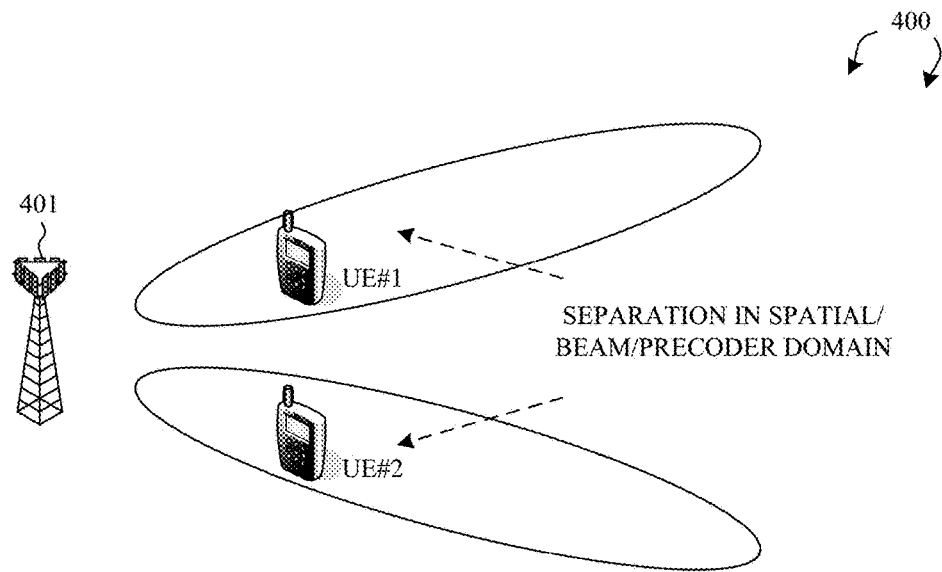
FIG. 4 illustrates a base station communicates with two UEs over a time-frequency resource in MU-MIMO operation.

FIG. 4 illustrates a base station communicates with two UEs over a time-frequency resource in MU-MIMO operation in mobile communication network 400. Mobile communication network 400 comprises a base station BS 401, a first UE #1, and a second UE #2. For MU-MIMO operation, BS 401 serves UE #1 and UE #2 in the same time-frequency resource. The signals dedicated to the two UEs are precoded with two distinct precoders and are separated in the spatial domain. In the ideal case, at the receiver of UE #1, the received power of the signal dedicated to UE #2 is very small. However, this is not always the case as this desirable condition relies on the prerequisite that BS 401 has accurate information of the wireless channels between the BS and the two UEs. If the condition is not met, the receiver may suffer from a strong interfering signal, and advanced interference handling algorithms are needed to guarantee a good signal reception quality. In general, these algorithms require the information related to the interfering signal.

In LTE, in the MU-MIMO transmission modes (TMs) including TMs 5, 8, and 9, the parameters related to the transmitted signal include the parameters are listed below:

Scheduling information.
Carrier indicator that indicates the component carrier index when carrier aggregation is configured.
Resource allocation header that indicates the type of resource allocation.
Resource block allocation that defines the resource blocks where the interfering signals reside.
Hybrid automatic repeat request (HARQ) process number specifying the HARQ process for the transport block being sent in the allocated resource blocks.
Indices of antenna ports.
Scrambling identity associated with the reference signal.
Number of layers.

Precoder (PMI).

Sounding reference signal (SRS) request to trigger the UE to transmit the SRS in the uplink direction.

Transmit power control (TPC) command for the physical uplink control channel (PUCCH).

Modulation and coding scheme (MCS) level indicating the modulation order and channel code rate corresponding to the transport block being sent in the allocated resource blocks.

Modulation order corresponding to the transport block being sent in the allocated resource blocks.

Channel code rate corresponding to the transport block being sent in the allocated resource blocks.

New data indicator to indicate whether the resource allocation is for new data or a retransmission.

Redundancy version determining the puncturing pattern applied to the channel coded transport block being sent within the allocated resource blocks.

Downlink assignment index to determine the number of accumulated downlink transmissions for which the BS is expecting an acknowledgement in TDD uplink-downlink configurations 1 to 6.

Figure 5:
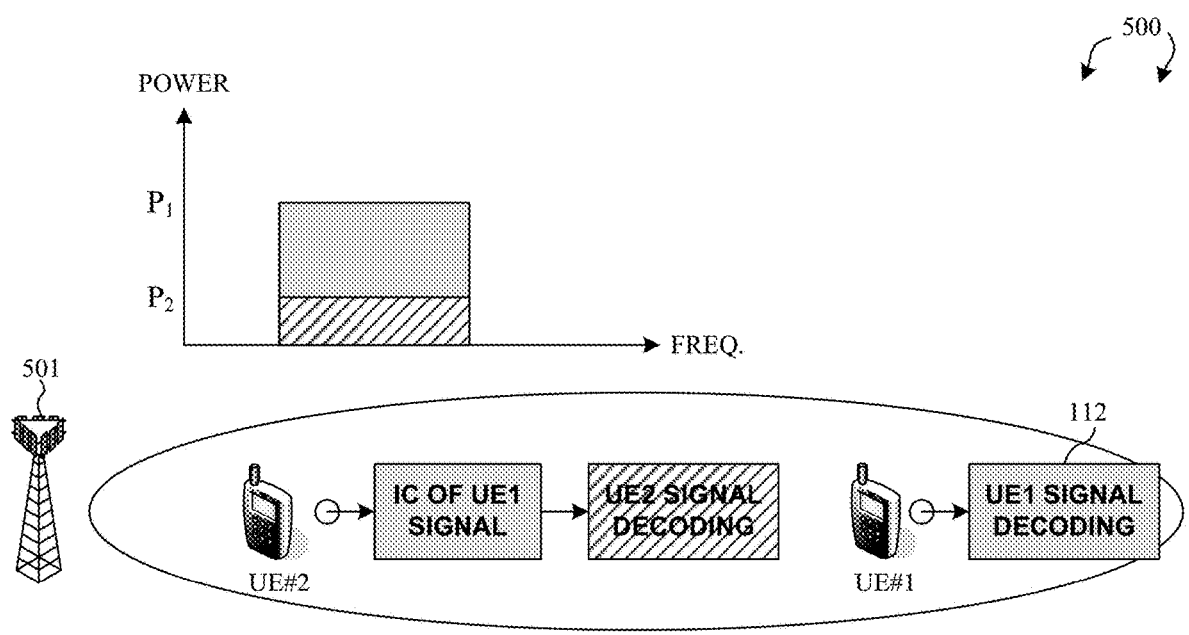
FIG. 5 illustrates a base station communicates with two UEs over a time-frequency resource in NOMA operation.

FIG. 5 illustrates a base station communicates with two UEs over a time-frequency resource in NOMA operation in mobile communication network 500. Mobile communication network 500 comprises a base station BS 501, a first UE #1, and a second UE #2. For NOMA operation, the signals to the two UEs are superposed and precoded with the same precoder. The received signal at UE #n, with n=1, 2, is give as:

$$y_n = h_n(x_1 + x_2) + w_n$$

Where
$h_n$ is the wireless channel,
$x_n$ is the symbol for UE #n with power level $P_n$, and
$w_n$ corresponds to the additive white Gaussian noise (AWGN) with variance $N_0$.

In FIG. 5, UE #1 is geographically far away from BS 501, while UE #2 is close to BS 501. Therefore, UE #2 has a stronger received signal than UE #1. As shown in FIG. 5, the transmit power allocated for the signal dedicated to the far-away UE (i.e., UE #1) $P_1$ is in general much stronger than to the close-by UE (i.e., UE #2) $P_2$. It can be shown that such power allocation strategy maximizes the system throughput in the sense of proportional fairness. When the BS assigns the modulation and coding scheme (MCS) level for UE #1's signal, the signal dedicated to UE #2 is regarded as an interfering signal from UE #1's perspective. From UE #2's perspective, since it has a better received quality of UE #1's signal than UE #1 does, i.e., $$\frac{|h_2|^2 P_1}{|h_2|^2 P_2 + N_0} > \frac{|h_1|^2 P_1}{|h_1|^2 P_2 + N_0} \text{ whenever } |h_2|^2 > |h_1|^2$$

Hence, UE #2 can decode the signal dedicated to UE #1 with UE #1's MCS level. After UE #2 decodes UE #1's information bits, the signal dedicated to UE #1 is reconstructed and then subtracted from the received signal to form a clean received signal. UE #2 can therefore decode its own signal via the clean received signal. In the above description, only two UEs are considered in the operation of NOMA. Actually, the number of UEs involved in NOMA is not limited. For example, if a UE #3 has a better received-signal-quality than UE #2, the signals dedicated to UEs #1, #2, and #3 can be superposed, and the UE #3 decodes the signals to UEs #1 and #2 and subtracts them from the received signal before decoding its own signal. In this scenario, the transmit power allocated to UE #3's signal is generally the least.

The operation of NOMA requires each co-channeled UE realizes the ratio between the power of its own signal and the power of a reference signal. In LTE, the reference signal can be downlink UE specific reference signal (DM-RS), cell-specific reference signal (CRS), or CSI reference signal (CSI-RS). This is for the UE to perform signal demodulation. For a UE having to do interference cancellation, e.g., UE #2 in FIG. 5, it also needs to know the ratio between the power of each interfering signal to be canceled and the power of a reference signal. This is for the purpose of the demodulation and the reconstruction of each interfering signal. The UEs having to perform interference cancellation also need an indication from the network. The indication indicates whether such interference cancellation behavior is required before detecting/decoding their own signals. Without interference cancellation, the signal to-interference-plus-noise ratio (SINR) is too low to decode the desired signal. To sum up, under the operation NOMA, the parameters a UE needs include information related to:

the power of its own signal (e.g., as compared to the power of a reference signal);

the power of each interfering signal to be cancelled (e.g., as compared to the power of a reference signal);

an indicator that indicates certain interference handling behavior, e.g., interference cancellation, is needed.

Note that the information of power ratio is not only beneficial to NOMA but also to MU-MIMO operation. In MU-MIMO, the power allocation to each beam needs not necessarily the same. The optimization of power allocation on the beams can further boost the throughput of MU-MIMO. In this case, the information regarding the power allocation on the beams needs to be signaled to the co-channeled UEs.

The above parameters, including the parts of MU-MIMO and NOMA, can be signaled to some or all of the UEs whose signals are present in the time-frequency resource for interference cancellation or suppression. The parameters can be signaled through PDCCH) and enhanced PDCCH (ePDCCH) in LTE, or they can be configured by the radio resource control (RRC) messages. To save the signaling overhead, it is possible that some of the parameters are signaled by an indicator that indicates a particular set of predefined rules are valid.

Further signaling overhead reduction is possible. Among the above list of parameters, some of them are common to all of the signals co-channeled in the time-frequency resource, such as the carrier indicator, resource allocation header, and the resource block allocation. Some of the parameters may take different values for different signals. The parameters that are common to all the signals can be multi-casted to all of the co-channeled UEs through one message. For those parameters that may take different values for different UEs, they can be sent to each UE individually. They can also be aggregated in one message and send to all the UEs for interference handling. Furthermore, all of the parameters, including those common to all signals and those that are specific to each signal, can be combined in one message and sent to all co-channeled UEs without consuming multiple copies of radio resources for the same information.

Figure 6:
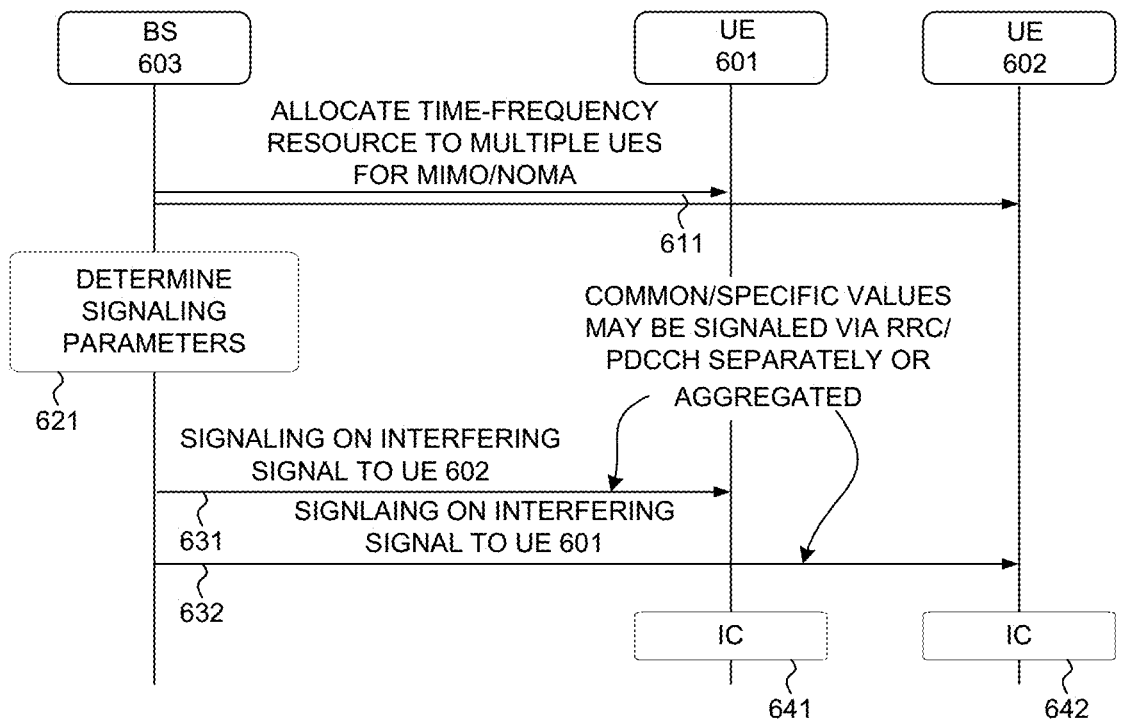
FIG. 6 illustrates one embodiment of BS signaling interference information to UEs for intra-cell IC.

FIG. 6 illustrates one embodiment of BS signaling interference information to UEs for intra-cell IC. In step 611, BS 603 allocates a time-frequency resource to multiple UEs including UE 601 and UE 602 for MU-MIMO or NOMA operation. In step 621, BS 603 determines which parameters about interfering signals need to be signaled to the UEs. In step 631, BS 603 signals UE 601 information about interfering signals dedicated to UE 602. In step 632, BS 603 signals UE 602 information about interfering signals dedicated to UE 601. Note that such information may be signaled via PDCCH/ePDCCH/RRC, and may be signaled separately or aggregated together in one message. In step 641, UE 601 performs IC based on the received information. In step 642, UE 602 performs IC based on the received information. In an alternative embodiment, either UE 601 or UE 602 performs IC.

In terms of the performance of interference handling, it is the best if the CW-IC receiver algorithm can be executed. That is, the receiver detects and decodes the interfering signal, reconstructs the contribution of the interfering signal in the receive signal, and then subtract it from the received signal. To successfully decode the interfering signal, the UE needs to descramble the received signal before doing the channel decoding. In LTE, the scrambling code for the PDSCH is user specific. Specifically, the scrambling code depends on the radio network temporary identifier (RNTI) of the target UE. Therefore, to implement the CW-IC algorithm, the receiver needs to know the scrambling rule used for the interfering signal. There are several possibilities about the scrambling rules of the signals dedicated to the co-channeled UEs.

In accordance with one novel aspect of supporting CWIC, the network notifies the UE which rule is used, or a scrambling rule is predefined and is known to the UE. The possible scrambling rules include:
  the rules scrambling the signals dedicated to the co-channeled UEs are the same and independent of the signatures of the UEs;
  the rule scrambling the signals dedicated to a UE is a function of the UE's signature;
  the rules scrambling the signals dedicated to the UEs are configured by the resource radio control;
  the rule scrambling the signals dedicated to the UEs is one of multiple configured candidates; additional signaling is required to indicate the one used for the scrambling rule.

Figure 7:
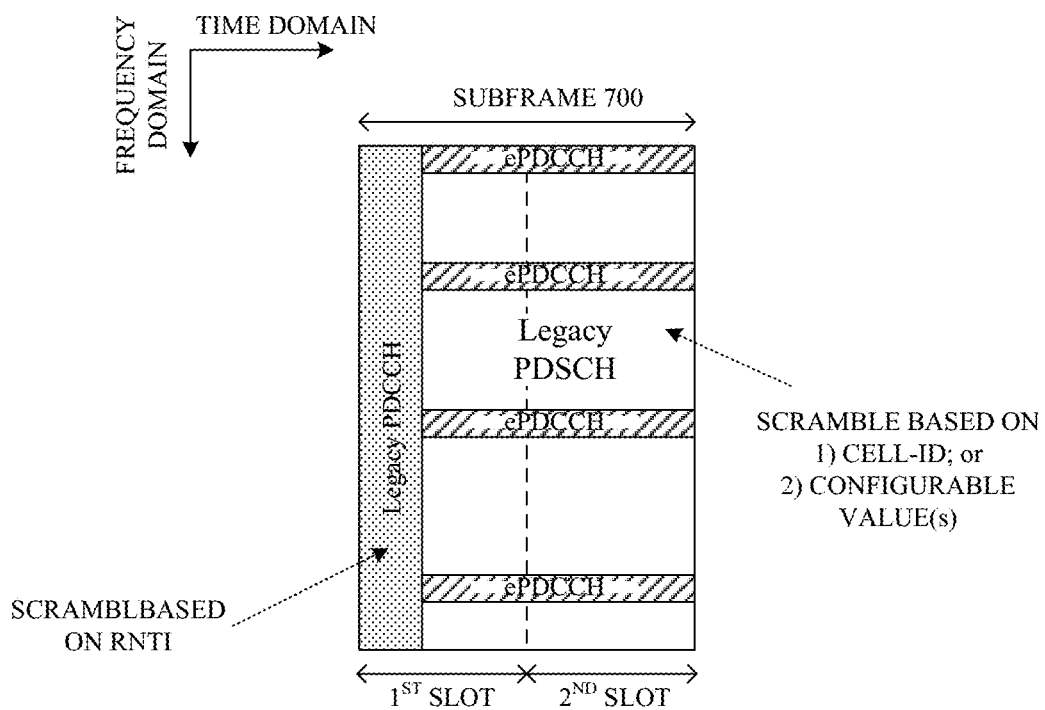
FIG. 7 illustrates the signaling of scrambling rules for supporting CW-IC.

FIG. 7 illustrates the signaling of scrambling rules for supporting CWIC in a subframe 700 of a radio frame. As illustrated in FIG. 7, each subframe includes resource elements allocated for control channel (legacy PDCCH and ePDCCH) and data channel (legacy PDSCH). For control channel, the base station applies scrambling with each UE's RNTI for protection. For data channel, the base station applies scrambling with 1) cell-specific value (e.g., Cell-ID), or 2) configurable value(s) by the base station. For interference cancellation purpose, the base station can signal the scrambling rule of the interfering signal to the victim UE, and the victim UE can decode/re-encode accordingly.

The network may not need to signal all necessary parameters to generate reference signal associated with inference, and UE can do some blind detection if some of the parameters are unknown. Consider a UE that is to cancel or suppress the interfering signal transmitted from the serving BS in the received signal. The UE receives some parameters from the BS related to the interfering signal. For some parameters that are needed to deal with the interfering signal but not signaled by the BS, the UE can detect the parameters from the received signal by itself. Based on the combination of the two sets of parameters, the UE can perform cancellation or suppression of the interfering signal. The parameters that can be signaled by the BS include all of those indicated in the previous subsection. Among these parameters, the following parameters related to the interfering signal may be blindly detected by the UE on its own:
  number of co-channeled UEs;
  indices of antenna ports;
  scrambling identity associated with the reference signal;
  number of layers;
  modulation order.

Figure 8:
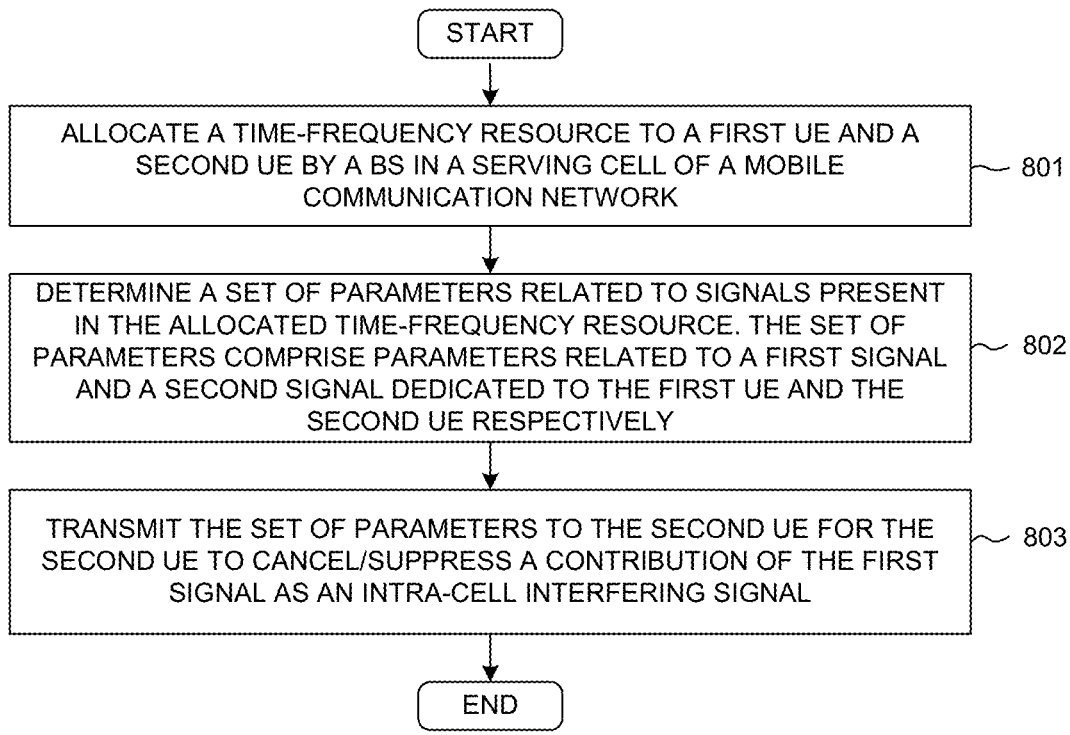
FIG. 8 is a flow chart of a method of intra-cell IC with network assistance from eNB perspective in accordance with one novel aspect.

FIG. 8 is a flow chart of a method of intra-cell IC with network assistance from BS perspective in accordance with one novel aspect. In step 801, a base station allocates a time-frequency resource to a first UE and a second UE in a serving cell of a mobile communication network. In step 802, the base station determines a set of parameters related to signals present in the allocated time-frequency resource. The set of parameters comprises parameters related to a first signal and a second signal dedicated to the first UE and the second UE respectively. In step 803, the base station transmits the set of parameters to the second UE for the second UE to cancel or suppress a contribution of the first signal as an intra-cell interfering signal.

Figure 9:
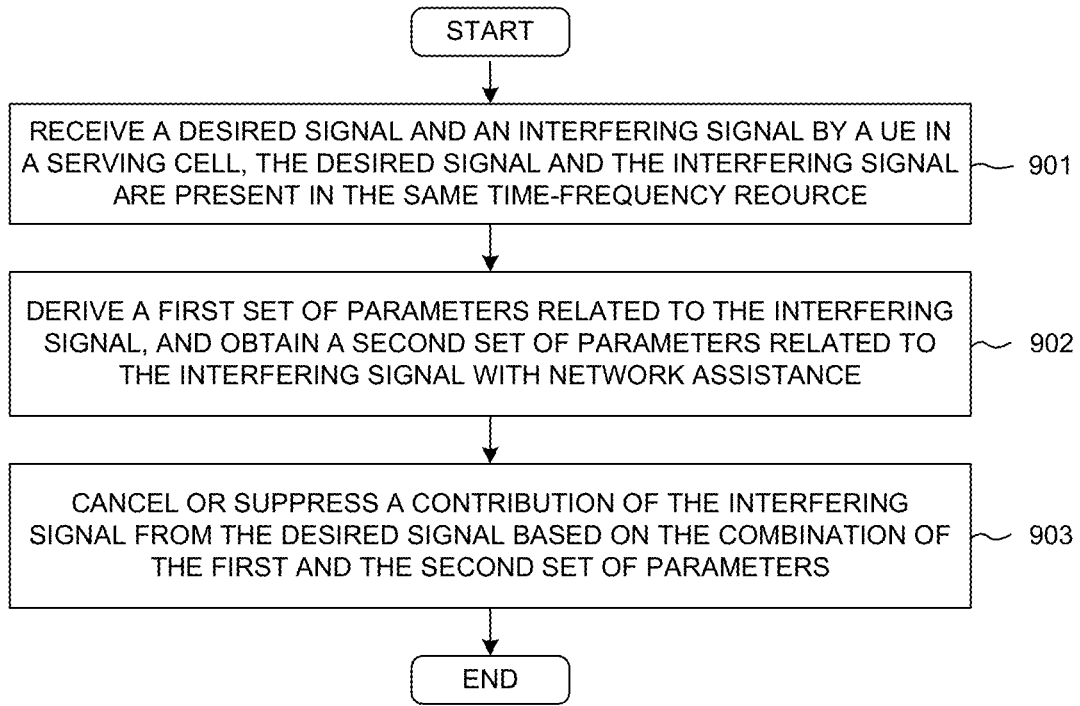
FIG. 9 is a flow chart of a method of intra-cell IC with network assistance from UE perspective in accordance with one novel aspect.

FIG. 9 is a flow chart of a method of intra-cell IC with network assistance from UE perspective in accordance with one novel aspect. In step 901, a user equipment receives a desired signal and an interfering signal in a serving cell of a mobile communication network. The desired signal and the interfering signal are present in the same time-frequency resource. In step 902, the UE derives a first set of parameters related to the interfering signal. The UE also obtains a second set of parameters related to the interfering signal with network assistance. In step 903, the UE cancels or suppresses a contribution of the interfering signal from the desired signal based on the combination of the first and the second set of parameters.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
  allocating a time-frequency resource to a first user equipment (UE) and a second co-channel user equipment (UE) by a serving base station (BS) in a serving cell of a mobile communication network;
  determining a set of parameters that includes
  power information of a first signal and a second signal dedicated to the first UE and the second UE, respectively, and
  an indicator indicating whether the second UE is required to perform an intra-cell interference suppression or cancellation process based on the power information before decoding the second signal; and
  signaling the set of parameters, including the power information and the indicator, to the second UE,
  wherein the intra-cell interference suppression or cancellation process includes cancelling or suppressing a contribution of the first signal as an intra-cell interfering signal, and
  wherein the indicator causes the second UE to determine whether to perform the intra-cell interference suppression or cancellation process before decoding the second signal according to the indicator as determined by the BS.

2. The method of claim 1, wherein the set of parameters comprises a first subset of parameters, each member of the first subset is common to all of the signals present in the time-frequency resource.

3. The method of claim 2, wherein the first subset of parameters comprises at least one of scheduling information, a resource allocation type, and resource blocks where the signals reside.

4. The method of claim 1, wherein the set of parameters comprises a second subset of parameters, each member of the second subset is specific to one of the signals present in the time-frequency resource.

5. The method of claim 4, wherein the second subset of parameters comprises at least one of scheduling information, indices of antenna ports, a scrambling identity associated with a reference signal, a number of layers, a modulation order corresponding to a transport block being sent in allocated resource blocks, and precoding information.

6. The method of claim 1, wherein the BS signals the set of parameters via a physical layer control channel or a higher layer signaling.

7. The method of claim 1, wherein the intra-cell interfering signal comes from a multi-user multiple-input-multiple-output (MU-MIMO) channel in the serving cell.

8. The method of claim 1, wherein the intra-cell interfering signal comes from a non-orthogonal multiple access (NOMA) channel in the serving cell.

9. The method of claim 8, wherein the power information comprises information related to a first signal power and a second signal power.

10. The method of claim 1, wherein the signaling the set of parameters to the second UE comprises transmitting a control message that includes the power information and the indicator via a Public Downlink Control Chanel (PDCCH) or an enhanced PDCCH (ePDCCH), or as a Radio Resource Control (RRC) message.

11. A method, comprising:
receiving, by a user equipment (UE) from a serving base station (BS) in a serving cell of a mobile communication network, an interfering signal corresponding to a first signal transmitted by the BS dedicated to another UE and a desired signal corresponding to a second signal transmitted by the BS dedicated to the UE, wherein the desired signal and the interfering signal are present in a same time-frequency resource;
receiving a set of parameters determined by the BS and signaled by the BS, the set of parameters including power information of the first signal and the second signal, and
an indicator indicating whether the UE is required to perform an intra-cell interference suppression or cancellation process before decoding the desired signal; and
determining whether to perform the intra-cell interference suppression or cancellation process before decoding the desired signal according to the indicator as determined by the BS, and performing the intra-cell interference suppression or cancellation process in accordance with a result of the determining, the intra-cell interference suppression or cancellation process including cancelling or suppressing a contribution of the interfering signal from the desired signal based on the power information.

12. The method of claim 11, wherein the set of parameters comprises a first set of parameters, and the first set of parameters comprises at least one of a number of co-channel UEs, indices of antenna ports, a scrambling identity associated with a reference signal, a number of layers, and a modulation order.

13. The method of claim 11, wherein the set of parameters comprises a second set of parameters, and the second set of parameters comprises at least one of scheduling information, a modulation order, a coding rate, precoding information, a mapping rule, power information, and resource allocation information.

14. The method of claim 11, wherein the interfering signal is from a multi-user multiple-input-multiple-output (MU-MIMO) channel in the serving cell.

15. The method of claim 11, wherein the interfering signal is from a non-orthogonal multiple access (NOMA) channel in the serving cell.

16. The method of claim 11, wherein the power information comprises information related to a first signal power and a second signal power.

17. A user equipment (UE), comprising:
a receiver configured to
receive, from a serving base station (BS) in a serving cell of a mobile communication network, an interfering signal corresponding to a first signal transmitted by the BS dedicated to another UE and a desired signal corresponding to a second signal transmitted by the BS dedicated to the UE, wherein the desired signal and the interfering signal are present in a same time-frequency resource; and
receive a set of parameters determined by the BS and signaled by the BS, the set of parameters including
power information of the first signal and the second signal, and
an indicator indicating whether the UE is required to perform an intra-cell interference suppression or cancellation process before decoding the desired signal; and
a processing circuit configured to:
determine whether to perform the intra-cell interference suppression or cancellation process before decoding the desired signal according to the indicator as determined by the BS, and perform the intra-cell interference suppression or cancellation process in accordance with a result of the determining, the intra-cell interference suppression or cancellation process including cancelling or suppressing a contribution of the interfering signal from the desired signal based on the power information.

18. The UE of claim 17, wherein the set of parameters comprises a first set of parameters, and the first set of parameters comprises at least one of a number of co-channel UEs, indices of antenna ports, a scrambling identity associated with a reference signal, a number of layers, and a modulation order.

19. The UE of claim 17, wherein the set of parameters comprises a second set of parameters, and the second set of parameters comprises at least one of scheduling information, a modulation order, a coding rate, precoding information, a mapping rule, power information, and resource allocation information.

20. The UE of claim 17, wherein the interfering signal is from a multiuser multiple-input-multiple-output (MU-MIMO) channel in the serving cell.

21. The UE of claim 17, wherein the interfering signal is from a non-orthogonal multiple access (NOMA) channel in the serving cell.

22. The UE of claim 17, wherein the power information comprises information related to a first signal power and a second signal power.

\* \* \* \* \*